US012786197B2

(12) United States Patent
Pollack et al.

(10) Patent No.: US 12,786,197 B2
(45) Date of Patent: Nov. 3, 2026

(54) NETWORK SERVICE ACCESS CONTROL

(71) Applicant: The Bank of New York Mellon, New York, NY (US)

(72) Inventors: Jeffrey M. Pollack, New York, NY (US); Dominic J. Valerio, New York, NY (US); Mitchel W. Hall, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 19/195,480

(22) Filed: Apr. 30, 2025

(65) Prior Publication Data

US 2026/0100956 A1 Apr. 9, 2026

Related U.S. Application Data

(60) Provisional application No. 63/705,028, filed on Oct. 8, 2024.

(51) Int. Cl.
*H04L 9/40* (2022.01)
*H04L 65/1045* (2022.01)

(52) U.S. Cl.
CPC ............ *H04L 63/102* (2013.01); *H04L 63/20* (2013.01); *H04L 65/1045* (2022.05)

(58) Field of Classification Search
CPC .... H04L 63/102; H04L 65/1045; H04L 63/20
See application file for complete search history.

(56) References Cited

U.S. PATENT DOCUMENTS

| | | | | |
|---|---|---|---|---|
| 6,178,505 B1 * | 1/2001 | Schneider | H04L 63/0218 713/168 |
| 6,343,323 B1 * | 1/2002 | Kalpio | H04L 63/08 705/40 |
| 7,873,734 B1 * | 1/2011 | Eidelman | H04L 67/142 709/227 |
| 8,327,419 B1 * | 12/2012 | Korablev | H04L 63/105 726/19 |
| 9,740,870 B1 * | 8/2017 | Shepard | G06F 21/60 |
| 9,780,966 B2 * | 10/2017 | Bomgaars | H04L 12/6418 |
| 10,547,456 B1 * | 1/2020 | Liljenstolpe | H04L 9/006 |
| 10,868,715 B2 * | 12/2020 | Brandwine | H04L 12/4641 |

(Continued)

FOREIGN PATENT DOCUMENTS

CN 111198817 A 5/2020

*Primary Examiner* — Jason Chiang
(74) *Attorney, Agent, or Firm* — NORTON ROSE FULBRIGHT US LLP

(57) ABSTRACT

Systems, methods, and computer-readable storage media for controlling access to network services are disclosed. In the disclosed embodiments, a set of controls for controlling access to one or more network services are defined. A first control of the set of controls may be determined for controlling access to a first network service of the one or more network services and a proxy rule is configured for the first network service based on the first control. When a request to access the first network service is received from a first computing device, access to the first network service may be controlled based on the proxy rule. The first network service may be a SaaS service and access control may authorized access to the SaaS service, block access to the SaaS service, limit access to the SaaS service, or isolate access to the SaaS service.

20 Claims, 5 Drawing Sheets

(56) References Cited

U.S. PATENT DOCUMENTS

| | | | | |
|---|---|---|---|---|
| 10,958,532 | B2 * | 3/2021 | Peterkin | G06N 5/046 |
| 11,159,576 | B1 * | 10/2021 | Ly | H04L 63/20 |
| 11,317,292 | B1 * | 4/2022 | Feldmann | H04W 12/08 |
| 11,811,829 | B2 * | 11/2023 | Agarwal | G06F 21/62 |
| 11,924,169 | B1 * | 3/2024 | Yoskowitz | H04L 47/125 |
| 11,930,045 | B1 * | 3/2024 | Baker | H04L 63/101 |
| 12,067,017 | B1 * | 8/2024 | Sharma | G06F 16/2358 |
| 2004/0260948 | A1 * | 12/2004 | Miyata | H04L 63/105 726/28 |
| 2005/0182965 | A1 * | 8/2005 | Murillo | G06F 21/6218 726/5 |
| 2006/0265599 | A1 * | 11/2006 | Kanai | H04L 63/10 713/182 |
| 2007/0211738 | A1 * | 9/2007 | Guo | H04L 65/103 370/401 |
| 2008/0183902 | A1 * | 7/2008 | Cooper | H04L 67/02 709/250 |
| 2008/0209535 | A1 * | 8/2008 | Athey | G06F 21/604 726/11 |
| 2011/0277026 | A1 * | 11/2011 | Agarwal | H04L 63/0815 726/8 |
| 2012/0005319 | A1 * | 1/2012 | McDougal | H04L 61/5053 709/221 |
| 2012/0084243 | A1 * | 4/2012 | Slavitch | G06N 5/02 706/47 |
| 2013/0346564 | A1 * | 12/2013 | Warrick | H04L 65/1045 709/219 |
| 2014/0090020 | A1 * | 3/2014 | Meiners | G06F 21/6209 726/4 |
| 2014/0137261 | A1 * | 5/2014 | Chen | G06F 21/105 726/26 |
| 2014/0278623 | A1 * | 9/2014 | Martinez | G06Q 10/06 705/7.12 |
| 2014/0289791 | A1 * | 9/2014 | Acharya | H04L 63/0236 726/1 |
| 2016/0294989 | A1 * | 10/2016 | Perlmutter | H04L 67/02 |
| 2016/0344736 | A1 * | 11/2016 | Khait | H04L 63/102 |
| 2017/0041383 | A1 * | 2/2017 | Xiong | H04L 67/10 |
| 2017/0171245 | A1 * | 6/2017 | Lee | G06F 16/958 |
| 2018/0351989 | A1 * | 12/2018 | Nazir | H04L 41/0803 |
| 2019/0268307 | A1 * | 8/2019 | Lancioni | H04L 63/20 |
| 2019/0327271 | A1 * | 10/2019 | Saxena | H04L 41/16 |
| 2020/0162431 | A1 * | 5/2020 | Goldschlag | H04L 9/3218 |
| 2020/0204463 | A1 * | 6/2020 | Guan | G06F 21/604 |
| 2020/0244646 | A1 * | 7/2020 | Mishaev | H04L 63/0823 |
| 2020/0280576 | A1 * | 9/2020 | Key | H04L 63/20 |
| 2021/0029197 | A1 * | 1/2021 | Kann | H04L 63/12 |
| 2021/0152582 | A1 * | 5/2021 | Hwang | H04L 63/0281 |
| 2021/0194888 | A1 * | 6/2021 | Bhaskar S | G06F 16/3347 |
| 2022/0027469 | A1 * | 1/2022 | Vivekanandan | G06F 21/562 |
| 2022/0129816 | A1 * | 4/2022 | Ralhan | G06F 40/216 |
| 2022/0247761 | A1 * | 8/2022 | Subbanna | H04L 63/20 |
| 2022/0247785 | A1 * | 8/2022 | Ly | H04L 63/1425 |
| 2022/0377098 | A1 * | 11/2022 | Singh | H04L 63/1433 |
| 2023/0155983 | A1 * | 5/2023 | Farmer | H04L 63/0263 726/12 |
| 2023/0222022 | A1 * | 7/2023 | Tsuchihashi | H04L 67/02 719/328 |
| 2023/0251956 | A1 * | 8/2023 | Dockter | G06F 11/3688 714/38.1 |
| 2024/0179182 | A1 * | 5/2024 | Hicks | H04L 63/20 |
| 2024/0259374 | A1 * | 8/2024 | Arora | H04L 63/0263 |
| 2025/0004738 | A1 * | 1/2025 | Jain | G06F 8/61 |
| 2025/0063048 | A1 * | 2/2025 | Mitani | H04L 12/22 |
| 2025/0126142 | A1 * | 4/2025 | Sethi | H04L 63/0281 |

* cited by examiner

NETWORK SERVICE ACCESS CONTROL

CROSS-REFERENCE TO RELATED APPLICATION

This application claims the benefit of priority of U.S. Provisional Patent Application No. 63/705,028 filed Oct. 8, 2024 and titled "SYSTEMS AND METHODS FOR NETWORK SERVICE ACCESS CONTROL," which is hereby incorporated by reference in its entirety.

TECHNICAL FIELD

The present disclosure generally relates to utilization of network services and more particularly, to systems and methods for detection and control of network service access.

BACKGROUND

Organizations and enterprises may maintain software inventories of existing software deployed within the organizations and enterprises. However, most organizations and enterprises consume a significant volume of network services, such as Software as a Service (SaaS) products, and existing software inventories typically do not include information on SaaS products (e.g., because these products do not require installation of software on a user computing device, etc.). As a result, certain organizations and enterprises might not have real data that may be used to control how SaaS products are accessed and might not have an ability to monitor use of cloud services in an effort to develop a control framework for SaaS products and network services.

Cloud access security broker (CASB) offerings may be utilized to identify SaaS products and services in use, but such tools typically only offer two outcomes: allow or block. Such limited options make it difficult for security practitioners to be flexible in their risk treatment, as SaaS services are varied and dynamic, thus requiring flexibility in how access is controlled. Another challenge with respect to controlling access to network services is scalability, since SaaS products are growing rapidly and are easy to access in a manner that circumvents existing software control practices, creating risk for an organization with respect to data loss, legal, privacy, and other types of risk. A control framework for SaaS-type network services needs to provide an enterprise with the ability to rapidly adapt control policies (e.g., as new services continue to proliferate) and provide appropriate controls so that workflows and processes that rely on network services are not disrupted significantly while managing risk to the enterprise as a whole.

SUMMARY

To overcome the challenges described above, aspects of the present disclosure provide systems, methods, and computer-readable storage media for controlling access to network services, such as SaaS services and products. In an aspect, the disclosed techniques support generation of an approval matrix. The approval matrix may define a diverse set of network service attributes and associated controls for accessing network services with different combinations of network service attributes. For example, the approval matrix may indicate a first control should be associated with network services having attributes A, B, C and a second control should be associated with network services having attributes C, D, E. When a new network service is detected, attributes of the network service may be compared to the approval matrix to determine corresponding controls defined therein that are to be applied to the new network service. Using the approval matrix in this manner enables newly detected network services to be controlled quickly, providing scalability to the control framework while enabling an enterprise to rapidly adapt to the changing landscape of network services in use within the enterprise.

Additionally, the disclosed techniques support generation of an enhanced inventory data structure that may enable tracking, monitoring, and periodic review of network services in use within an organization. The enhanced inventory data structure may provide a comprehensive view of network services in use within an enterprise, controls associated with each network service, and network service attributes (e.g., governance information, information technology and security architecture information, configuration management database (CMDB) information, network service features, and the like). The enhanced inventory data structure may be periodically reviewed and updated to refine the controls associated network services, such as to enable monitoring use of network services and refine the accessible services (e.g., retire unnecessary services, analyze new services, and the like). In this manner, the enterprise may have a comprehensive view of network services in use within the enterprise, enabling risk to be properly evaluated and, where appropriate, controls to be put in place to manage potential risks.

An enforcement proxy may be configured to apply the controls defined in the enhanced inventory data structure to requests to access network services. The proxy rules and controls may provide access to network services on a granular level that is more flexible than current techniques, such as the binary approach provided by CASB tools. For example, the enforcement proxy may apply different controls for a same network service, such as to allow access to a network service for a first user or user group and provide restricted access or deny access to a second user or user group. Restricted access controls may allow access to a network service, but with restrictions on how the user(s) interacts with the service. For example, the user may be granted read-only access to the network service. Providing additional controls via an enforcement proxy provides the technical advantage that control is enforced and managed within an organization, rather than relying on third party tools (e.g., CASB) and the proxy rules may be designed to operate in cooperation with an enterprise's existing proxy policies. For example, a request access to certain network services may trigger appending of header information to the request, where the header information triggers activation of certain controls.

The various concepts described above provide a programmatic approach to governance of network services, by discovering network services usage, delineating approval state from business data sources, developing controls, defining a process for approval of network services and controls, and mechanisms for restricting unapproved network services. The disclosed control framework also supports thorough review of network services via monitoring and updating of the enhanced inventory data structure. Such periodic monitoring and review may avoid disrupting business processes that depend on network service solutions, regardless of proper approval, while also enabling appropriate evaluation of risk. The approval matrix, enhanced inventory data structure, and enforcement proxy, in combination, provide a powerful suite of tools that may be used to successfully assess, evaluate, and mitigate enterprise risks associated with use of network services, while also supporting discovery, inventory, and review of every network services in-use across the enterprise (including new or emerging network services) and granular control of access to network services in a manner not previously provided for network services, such as SaaS products.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
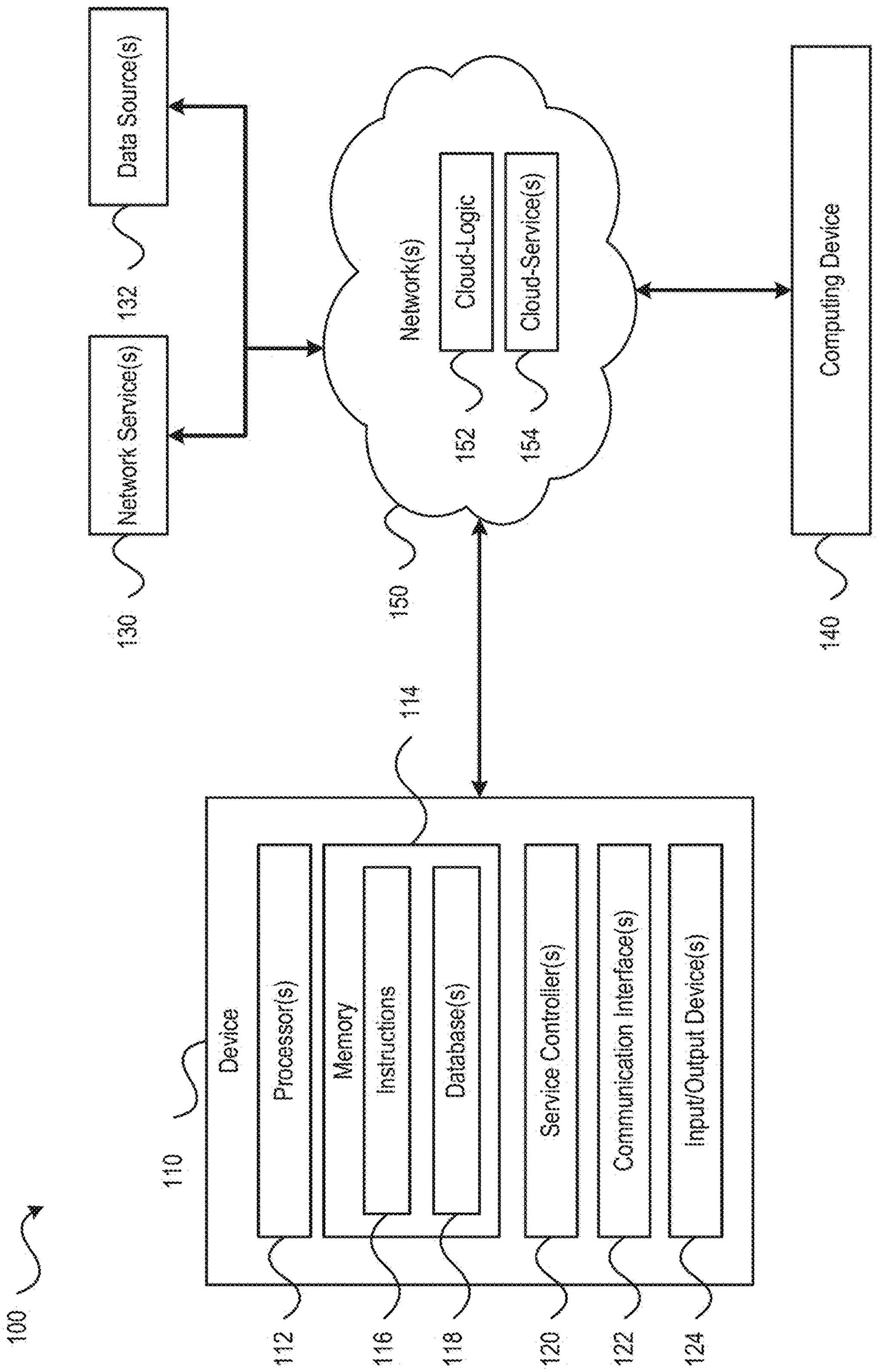
FIG. 1 is a block diagram illustrating an example system for controlling access to network services in accordance with aspects of the present disclosure.

Referring to FIG. 1, a block diagram illustrating a system for controlling access to network services in accordance with aspects of the present disclosure is shown as a system 100. As shown in FIG. 1, the system 100 includes a device 110. In an aspect, the functionality described with respect to the device 110 may be implemented via a cloud, as shown by cloud-logic 152, rather than via a server or other type of computing device. The device 110 includes one or more processors 112, a memory 114, one or more service controllers 120, one or more communication interfaces 122, and one or more input/output (I/O) devices 124. Each of the one or more processors 112 may be a central processing unit (CPU), a graphics processing unit (GPU), or other computing circuitry (e.g., a microcontroller, one or more application specific integrated circuits (ASICs), and the like) and each processor 112 may have one or more processing cores. The memory 114 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 114 may store instructions 116 that, when executed by the one or more processors 112, cause the one or more processors 112 to perform the operations described in connection with the device 110 with reference to FIGS. 1-6. The one or more communication interfaces 122 may be configured to communicatively couple the device 110 to the one or more networks 150 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 124 may include one or more display devices, a keyboard, a stylus, one or more touchscreens, a mouse, a trackpad, a camera, one or more speakers, haptic feedback devices, or other types of devices that enable a user to receive information from or provide information to the device 110.

The one or more service controllers 120 may be configured to provide functionality to support detection of network services in accordance with the concepts described herein. For example, the service controller(s) 120 may dynamically or automatically discover network services and generate an inventory of the discovered network services. The network service discovery process may be performed continuously (e.g., the service controller 120 may include functionality to monitor activity of a network to detect attempts to access network services) or periodically (e.g., every 5 minutes, 15 minutes, 30 minutes, every hour, every 6 hours, every 12 hours, once per day, once per week, or another suitable time period). As new network services are discovered, the service controller 120 may update the inventory of network services. In an aspect, discovery of network services may be based on one or more approved data sources. Example aspects of network service discovery and data source approval processes are described in more detail below with reference to FIG. 2.

The service controller 120 may maintain information associated with one or more approval sources in a database (e.g., one of the one or more databases 118). The information associated with the one or more approval sources may contain information associated with governance policies or other information, such as evidence of prior approval documented by other governance groups, that may be used to determine approvals during configuration of network access in accordance with the concepts described herein.

The service controller 120 may also maintain a database of access controls that may be applied to network services. Each access control may define different functionality to control how users interact with the network services. As non-limiting examples, the access controls may include an unsanctioned control, a read-only control, and a sanctioned control. When the unsanctioned control is applied to a network service, access to the network service may be denied or blocked. The read-only control may be used to prevent data upload to one or more network services. The sanctioned control may be used to permit access to one or more network services. It is noted that the example controls described above have been provided by way of illustration, rather than by way of limitation and that other types of controls (e.g., a no download control that enables a user to upload to, but not download data from a network service, an isolation control that protects from network malware exposure via web browser isolation techniques, or a caution control that warns users of potentially risky activity prior to granting access to a network service) may be utilized to control access to network services in accordance with the concepts described herein. Furthermore, it is noted that the controls may be applied to network services generally (e.g., apply to all users) or granularly (e.g., different controls may be applied to network services based on generally or granularly. For example, a first network service may be associated with an unsanctioned control applicable to all users generally, while another network service may be associated with an unsanctioned control for a first set of users and a sanctioned or read-only control for a second set of users. It should be understood that different sets of users may be designated by user type, such as a first user type (e.g., information technology (IT) administrator), a second user type (e.g., accounting department), a third user type (e.g., developer), and so on. Each user type may be associated with the same or different network service controls, thereby providing a high degree of control over access to network services using the techniques described herein.

The service controller 120 may also be configured to generate an enhanced inventory data structure that maintains an inventory of network services. For example, the one or more databases may include a network services database maintaining a basic inventory of network services. The basic inventory of network services may maintain simplistic information about known network services, such as a service name, a service identifier, a service manufacture, or other information about network services. The service controller 120 may be configured to enhance the basic inventory of network services to produce the enhanced inventory data structure by incorporating additional information corresponding to one or more of the network services. An example enhanced data structure is described in more detail below with reference to FIG. 4. The enhancements incorporated into the enhanced data structure may be designed or configured to enable management and control of access to network services in accordance with the concepts described herein. As an example, SaaS services may be accessed without requiring installation of software on a computing device, such as the computing device 140 of FIG. 1 (e.g., a computing device associated with a user of an organization). In such instances, the controller 120 may be configured to detect access to the new network service (i.e., new in the sense that it has not been previously access or evaluated to determine what controls should be applied) and apply a default control (e.g., sanctioned or unsanctioned) to the network service. In an aspect, the network service may be detected as a new network service by determining whether the network service is identified in the enhanced inventory data structure (i.e., has enhancement data been incorporated into the enhanced inventory data structure for the network service). If the network service is identified in the enhanced inventory data structure but enhancement data has not been incorporated therein, the service controller 120 may apply a sanctioned control or an unsanctioned control. As described in more detail below, the service controller 120 may determine which control (i.e., the sanctioned control or the unsanctioned control) to apply to a new network service based on one or more criteria. It is noted that controls associated with different network services may be changed over time (e.g., changing from a default control to a different control, changing from a control applied at a first point in time to a different control, and the like).

The service controller 120 provides functionality to generate an approval matrix. The approval matrix may specify one or more criteria that may be used to associate controls (e.g., sanctioned, unsanctioned, read-only, no download, and the like) to each network service. In an aspect, each of the defined controls may be associated with a network service based on at least one criterion. For example, a first criterion may be a security criterion, a second criterion may be a data criterion, and a third criterion may be utility criterion. The security criterion may specify one or more security characteristics or attributes that may be used to determine whether to permit access to a network service or deny access to a network service. To illustrate, the security criterion may indicate that access to the network service may be authorized (i.e., a sanctioned control) if the network services is provided by a vendor having a threshold security rating and that access may be denied (i.e., an unsanctioned control) otherwise. As another example, the data criterion may specify that network services allowing data to be uploaded to the network service may be unsanctioned (e.g., to prevent upload of inappropriate data to the service, such as personally identifiable information (PII) data that may be subject to data privacy regulations or confidential information of a business or organization). The utility criterion may specify that network services providing specific functionalities may be sanctioned (e.g., access permitted) if the network services provide functionality that is required or desired (e.g., permitting access to a video conferencing, messaging, or file sharing application, such as MICROSOFT TEAMS®) and unsanctioned otherwise (e.g., denying access to a network service). Additionally, the criteria utilized by the services controller may include a governance criterion, an IT architecture criterion, a CMDB criterion, and/or an inventory criterion. The governance criterion may indicate whether one or more governance policies have been defined for the network service. The IT architecture criterion may indicate one or more IT characteristics for a network service. The inventory criterion may indicate whether the network service is identified in a software inventory (e.g., the enhanced inventory data structure, the initial or non-enhanced inventor, or another inventory of network services). It is noted that the example criteria explained above have been provided by way of illustration, rather than way of limitation and that other criteria may be defined and utilized to control access to network services in accordance with the concepts described herein.

The approval matrix may provide a data structure for associating or applying controls to network services. In an aspect, the approval matrix may include different combinations of criteria and controls. An example approval matrix is shown in Table 1 below:

TABLE 1

| | | | | | | | | | | | | | | | | |
|---|---|---|---|---|---|---|---|---|---|---|---|---|---|---|---|---|
| | | | | | | | | | | | | | | | | A/B/C/D |
| Gov. | Y | Y | Y | Y | Y | Y | Y | Y | Y | Y | Y | Y | — | — | — | |
| IT Arch. | Y | Y | Y | — | — | — | Y | Y | Y | — | — | — | Y | Y | Y | |
| CMDB | Y | Y | Y | — | — | — | Y | Y | Y | — | — | — | Y | Y | Y | |
| Inv. | Y | N | — | Y | N | — | Y | N | — | Y | N | — | Y | N | — | |
| Control | S | S | S | S | RO | S | S | RO | S | S | RO | S | S | RO | RO | S/RO/U/U |
| Recom. | — | C | C | — | — | C | — | — | C | — | — | C | — | — | C | I/I/I/R |

As shown above in Table 1, the approval matrix may include various combinations of criterion values, including one or more governance criteria (second row of Table 1), one or more IT architecture criteria (third row of Table 1), one or more CMDB criteria (fourth row of Table 1), one or more inventory criteria (fifth row of Table 1), one or more controls (sixth row of Table 1), and one or more recommendations (seventh row of Table 1). With regard to the governance criteria, "Y" indicates a governance policy has been defined relevant to the network service and "-" indicates that no governance policy has been defined. With regard to the IT architecture criteria, "Y" indicates at least one IT architecture criteria relevant to the network service has been defined and "-" indicates that no IT architecture criteria relevant to the network service has been defined. With regard to the CMDB criteria, "Y" indicates at least one CMDB policy has been defined relevant to the network service and "-" indicates that no CMDB policy has been defined. With regard to the inventory criteria, "Y" indicates the network service has been defined in the enhanced inventory data structure, "N" indicates the information associated with the network service has not been enhanced in the enhanced inventory data structure, and "-" indicates that no information associated with the network service is included in the enhanced inventory data structure. The one or more controls include "S", "U", and "RO", indicating sanctions, unsanctioned, and read-only controls, respectively. The one or more recommended actions include "-", "C", "I", and "R", corresponding to no action needed, "contained", "ignore", and "reject". In an aspect, the reject recommendation may be used to apply an unsanctioned control to a network service. Network services associated with "-", "C", or "I" recommendations may be associated with sanctioned or read-only controls. In an aspect, network services associated with "I" may also be associated with unsanctioned controls. In the rightmost column of Table 1 criteria "A", "B", "C", and "D" are defined. For example, "A" may correspond to one or more acceptable personal use criteria (e.g., personal banking, insurance, taxes, etc.), "B" may correspond to informational services (e.g., news services), "C" may correspond to unacceptable usage risks (e.g., streaming services), and "D" may correspond to cybersecurity risks. Network services associated with the "A" criterion may be associated with ignore recommendations and the sanctioned control. Network services associated with the "B" criterion may be associated with ignore recommendations and the read-only control. Network services associated with the "C" criterion may be associated with ignore recommendations and the unsanctioned control, and network services associated with the "D" criterion may be associated with reject recommendations and the unsanctioned control.

As can be appreciated from Table 1 and the description above, the approval matrix may provide a framework for evaluating network services and associating controls with the network services based on the evaluation. For example, during evaluation, values for one or more of the criteria in the first to fifth rows of Table 1 may be determined. The combination of values determined during evaluation may then be correlated to the approval matrix to determine recommendations and controls to apply to the evaluated network service. For example, a network service having "Y" for governance, IT architecture, inventory, and CMDB criteria may receive the "S" control and "-" recommendation (i.e., first column of Table 1). It is noted that the example approval matrix shown in Table 1 is provided for purposes of illustrating various combinations of criteria and criteria values that may be generated by the service controller 120 in accordance with the concepts described herein. However, it is to be appreciated that additional criteria and/or criteria values may be utilized to construct an approval matrix. Additionally, the specific criteria and values of the approval matrix may evolve or change over time, such as to account for new or emerging services, service types, cybersecurity risks, or other factors. When such changes happen, the service controller 120 may be configured to re-evaluate one or more (or all) services for which controls and/or recommendations were previously determined and applied (i.e., before the approval matrix was updated or changed) to determine whether the changes to the approval matrix require any changes to the manner in which controls and/or recommendations are applied to various ones of the network services.

The service controller 120 may also provide functionality to define a search and weighting process that may be used to support operations to control access to network services. For example, the search and weighting process functionality may be configured to search the one or more data sources (e.g., the one or more databases 118 or other data stores) to obtain information regarding a new network service that has been detected. In an aspect, the one or more databases 118 searched may include a CASB data store, software documentation, or other data sources (e.g., the one or more data sources determined using the functionality of the services controller 120 described above). Example features of network services that may be evaluated by the search and weighting process may include vendor information (e.g., a vendor that hosts or developed the network service), a category of the network service, service name or identifier, a product identifier, version or edition information, service type, lifecycle information (e.g., approved, pending, etc.), software documentation, or other types of information. The various data sources may be weighted such that different data sources are considered more important or more relevant to the analysis of network services. For example, Table 2 illustrates an example weighting that may be applied to different data sources:

TABLE 2

| | | |
|---|---|---|
| GOV | Description contains name of service and status: terminated | 1 |
| GOV | Description contains name of service and status: termination pending/initiated | 2 |
| GOV | Description contains name of service and status: planning - draft | 3 |
| GOV | Description contains name of service and status: planning - approved | 4 |
| GOV | Description contains name of service and status: due diligence | 4 |
| GOV | Description contains name of service and status: ongoing monitor | 5 |
| GOV | Description contains name of service | 6 |
| GOV | Vendor name matches name of service | 7 |
| GOV | Engagement name matches name of service | 8 |
| GOV | Vendor name matches and engagement name matches name of service | 9 |
| GOV | Vendor name matches and engagement name matches name of service and description mentions cloud keyword list | 10 |
| SPL | Software name contains name of service and status: retired | 1 |
| SPL | Software name contains name of service and status: rejected | 2 |
| SPL | Software name contains name of service and status: under review | 3 |
| SPL | Software name contains name of service and status: sunset | 5 |
| SPL | Software name contains name of service and status: approved | 6 |
| SPL | Software name contains name of service and status: approved - limited | 6 |
| SPL | Software name contains name of service and status: emerging | 6 |
| SPL | Software name contains name of service and status: contained | 6 |
| SPL | Software name matches exactly name of service and type = "Y" | 9 |
| SPL | Software name matches exactly name of service and type = "Z" | 10 |

As shown above, the data sources may include "GOV" data sources (e.g., governance data sources) and "SPL" data sources (e.g., service product lifecycle data sources). It is noted that the data sources and weights described above are provided by way of non-limiting example, rather than by way of limitation and that the service controller 120 may utilize the above-described data sources, additional data sources, or a combination thereof, as well as different weights, as configured in accordance with the concepts described herein.

In an aspect, the search and weighting functionality may be performed in a fully or partially automated manner. For example, the service controller 120 may detect a new service and initiate the search and weighting process to determine one or more features or characteristics of the network service using the approved or defined data sources. In an aspect, artificial intelligence, for example, a large language model (LLM), may be used to perform the search and weighting process. For example, a name or other information associated the detected network service may be provided as input parameters to the LLM. The LLM may be trained to use the input parameters to extract information associated with the network service from the one or more data sources. The extracted information may then be used to classify one or more attributes of the service. For example, the one or more attributes may include values for various ones of the criteria described above with reference to Table 1, which may then be used to determine control and recommendation information for the new network service. In an aspect, the classification may account for the weights applied to the extracted information when determining the attributes. In an additional or alternative aspect, the extracted information may be used to populate the enhanced inventory data structure described above. It is noted that the artificial intelligence model (e.g., the LLM or other type of model(s)) may be periodically trained, such as to enable the model(s) to account for changes to inventory data that may change frequently. During training the artificial intelligence model(s) may additionally be validated for accurate and complete retrieval or response. For example, multiple records may be found within inventories that could relate to one or more network services in question and the response should be able to reconcile these records and provide appropriate responses or processing of the information in the records (e.g., not create multiple records in the enhanced inventory data structure). In an aspect, handling of multiple records and validation of the artificial intelligence model(s) may be addressed via implementation of a weighting model. As an example, the weighting model may focus an attention principle of an LLM.

The service controller 120 may be configured to control access to network services using the above-described processes. For example, in FIG. 1 the computing device 140 is shown. The computing device 140 may be a laptop computing device, a personal computing device, a tablet computing device, a mobile communication device (e.g., a smartphone, smartwatch, a cellular phone, etc.), a gaming console, a display device (e.g., a smart television, etc.), or other type of device. A user of the computing device 140 may attempt to access a network service 130, which may be a SaaS service or other type of service for which the controller 120 controls access. The service controller 120 may control access to the network service 130 by configuring proxy information. For example, the service controller 120 may insert configuration information into one or more proxy headers used by a web proxy, where the configuration information indicates whether the user is authorized to access the network service (i.e., because the service controller 120 can control access on a per-user and/or per-user-type basis).

It is noted that while FIG. 1 shows the device 110 as a stand-alone device (e.g., a server, a personal computing device, a laptop computing device, etc.), the functionality provided by the device 110 and the service controller 120 may be provided in other configurations, such as in a distributed configuration via multiple devices 110 or via computing resources deployed in a cloud and configured to provide the functionality described with reference to the device 110 and the service controller 120 (e.g., cloud-logic 152). The above-described processes for controlling access to one or more network services 130 and operations of the service controller 120 are described in more detail below with reference to FIGS. 2-4.

Figure 2:
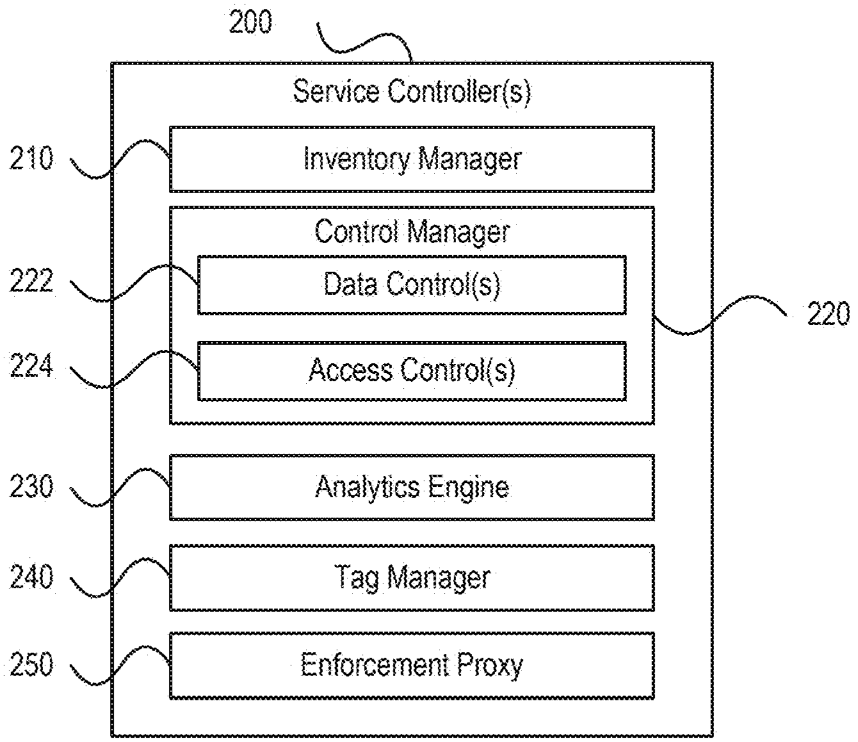
FIG. 2 is a block diagram illustrating an example controller for controlling access to network services in accordance with aspects of the present disclosure.

Referring to FIG. 2, a block diagram of a service controller in accordance with aspects of the present disclosure is shown as a service controller 200. In an aspect, service controller 200 may be the service controller 120 described above with reference to FIG. 1. As shown in FIG. 2, the service controller 200 includes an inventory manager 220, a control manager 220, an analytics engine 230, a tag manager 240, and an enforcement proxy 250. It is noted that operations described with reference to the service controller 200 may be stored as instructions (e.g., the instructions 116 of FIG. 1) that, when executed by one or more processors (e.g., the one or more processors 112 of FIG. 1), cause the one or more processors to perform operations for controlling access to network services in accordance with the concepts described herein.

The inventory manager 220 may provide functionality for generating and maintaining the enhanced inventory data structure(s). As briefly described above, the enhanced inventory data structure may incorporate attributes and other information associated with network services that may be used by the service controller 200 to provide access control functionality for controlling access to network services. As a non-limiting example and referring to FIG. 4, an enhanced inventory data structure in accordance with aspects of the present disclosure is shown as an enhanced inventory data structure 400. The data structure 400 includes a first set of data 410 and a second set of data 420. The first set of data 410 may incorporate data extracted from one or more data sources (e.g., the one or more databases 118, the one or more data sources 132 of FIG. 1). For example, the information included in the first set of data 410 may include a network service identifier (first column), a network service name (second column), vendor information (third column), and status information (fourth column). In an aspect, the first set of data 410 may be maintained in a database, such as a software inventory maintained by an organization. However, such inventories are typically only maintained to track basic information about software applications, such as what software applications are currently in use by an organization and may not track or include network services that do not require installation of software on a local computing device (e.g., SaaS services). Furthermore, even where such basic inventories do track network services, the inventory information may only provide the basic details, which are insufficient to provide access control.

Figure 4:
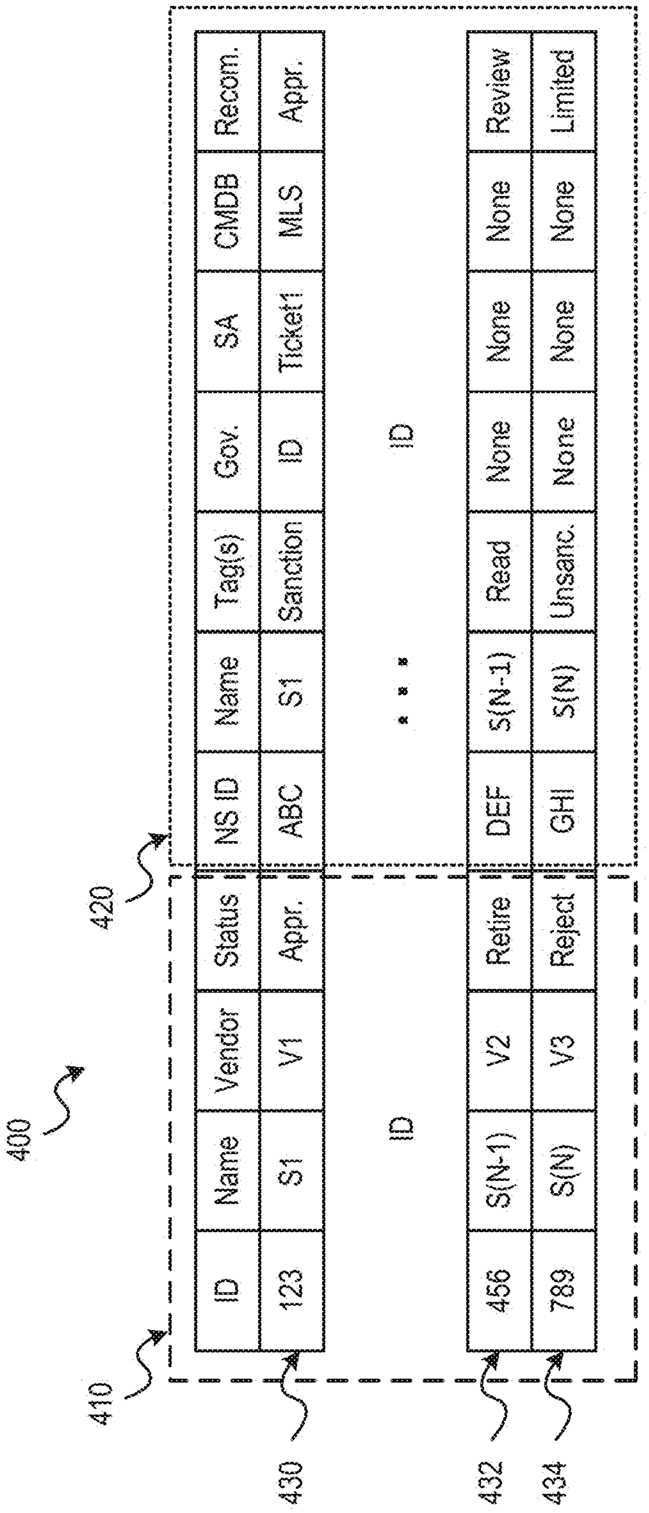
FIG. 4 is a block diagram of an example enhanced inventory data structure in accordance with aspects of the present disclosure.

The inventory manager 210 may initialize the enhanced inventory data structure 400 with the first set of data 410 and then integrate additional information (i.e., information not included in the first set of data 410) extracted as described herein to produce the enhanced inventory data structure 400. The second data set 420 is shown in FIG. 4 as including various types of information, including: a network service identifier (fifth column), a network service name (sixth column), one or more control tags (seventh column), governance data (eighth column), security architecture (SA) data (ninth column), CMDB data (tenth column), and one or more recommendations (eleventh column). The network service identifier may be an identifier used to identify a network service, such as a CASB identifier. The network service name may be a name of the network service, which may be the same as the name included in the first data set 410. In an aspect, multiple different names may be recorded to the enhanced inventory data structure. For example, if disparate data sources have been normalized or follow a same naming convention the names may be the same. However, a different name relating to the same entity, ID, or network service may occur if disparate, unnormalized data sources record the same network service under different names. Recording different names into the enhanced inventory data structure 400 may enable more accurate identification of services where disparate sources of service information utilize non-uniform naming conventions. The one or more control tags may correspond to access controls associated with a particular network service. For example, in FIG. 4 each row 430, 432, 434 of the enhanced inventory data structure 400 may correspond to a different network service. The network service associated with row 430 has a sanction control tag, the network service associated with row 432 has a read-only control tag, and the service associated with row 434 has an unsanctioned control tag. The governance data may identify one or more pieces of governance information relevant to controlling access to network service, such as the example governance information described above with reference to Table 2. The SA data, which may be recorded and provided in security architecture governance documentation, may provide information associated with a security architecture of the network service. The CMDB data may identify one or more configuration management databases storing information about hardware and/or software information relevant to the network service. The presence of the network service in the CMDB may indicate that a prior review of the network service or its components was conducted. This evidence may be used to document governance information for the network service and determine a state of approval (e.g., whether the network service should be labelled sanctioned, unsanctioned, read-only, isolate, etc.). The one or more recommendations may correspond to the recommendations described above with reference to Table 1.

It is noted that FIG. 4 illustrates the enhanced inventory data structure 400 as an array data structure for purposes of illustration, rather than by way of limitation and that enhanced inventory data structures may be generated based on other data structures in accordance with the concepts described herein. Additionally, it is to be understood that the specific types of data shown in the enhanced inventory data structure 400 are shown by way of non-limiting example and that more or less information may be included in enhanced data inventory structures in some aspects. For example, an enhanced inventory data structure may include information identifying a network service category, such as information classifying each network service into one or more categories (e.g., news, collaboration, productivity, entertainment, data analytics, and the like). As another example, an enhanced inventory data structure may include a notes field in which one or more analysts may input notes and information based on analysis of a network service, such as to indicate a status of a review process, an outcome of the review process, or other types of information.

Referring back to FIG. 2, the control manager 220 may be configured to provide functionality for defining controls that may be associated with network services. For example, the controls may include data controls 222 and access controls 224. The data controls 222 may be configured to limit functionality of network services involving upload and downloading of data, while the access controls 224 may be configured to limit a user's ability to access a network service. For example, the above-described read-only control is an example of a data control 222 and may be used to prevent users from providing data to a network service, but the user may still view data via the network service and/or download data from the network service (e.g., assuming other types of controls are not also applied). Similarly, the above-described sanctioned and unsanctioned controls are examples of access controls 224 that may permit or deny access to a network service, respectively. It is noted that the control manager 220 may be utilized to define multiple different data controls 222 and access controls 224 that may be used to how users interact with and access network services. In addition to defining the set of available data controls 222 and access controls 224, the control manager 220 may also be configured to enable controls (e.g., data controls 222 and/or access controls 224) to be associated with individual users, user groups or types (e.g., a department, a user role, etc.), geographic locations (e.g., one or more controls may be applied to users at a particular geographic location and different controls applied to users at a different geographic location), or other types of micro-level and/or macro-level controls.

The analytics engine 230 may provide functionality to support one or more analytics utilized to evaluate and analyze network services. For example, the analytics engine 230 may be configured to enable a user (e.g., IT personnel or network security personnel or a systems administrator) to analyze characteristics and features of a network service. The analytics may be configured to extract features and characteristics of network services, such as whether the network service enables data upload, types of data for upload (e.g., PII data), data download capabilities of a network service, types of data that may be downloaded from the network service, or other types of network service features. The analytics may be incorporated into the enhanced inventory data structure if desired.

The tag manager 240 provides functionality for associating controls to network services. For example, the tag manager 240 may be configured to generate the approval matrix described above with reference to Table 1. Once generated, the tag manager 240 may utilize the approval matrix to determine which of the controls (e.g., data controls 222 and/or access controls 224) should be associated with each network service and may update the enhanced inventory data structure with the appropriate control tags for each service in accordance with the approval matrix.

The enforcement proxy 250 may be responsible for enforcing the various controls configured for network services. For example, the enforcement proxy 250 may be configured to leverage order of precedence in a web proxy configuration policy to control access to and interaction with network services. As a non-limiting example, and referring to FIG. 6, a block diagram of a web proxy configuration for controlling access to network services in accordance with the present disclosure is shown as a web proxy configuration 600. The web proxy configuration 600 may include proxy auto-configuration (PAC) file 602, an SSL break and inspect rule 610, a global policy rule 620, a browser isolation rule 640, and an Internet content adaptation protocol (ICAP)-send to data loss prevention (DLP) rule 650. The PAC file 602 may be an auto-configuration file that may be published to some or all devices (e.g., via a group policy). The PAC file 602 may be configured to direct web traffic to the proxy (e.g., the enforcement proxy 250 of FIG. 2 or the services controller 120 of FIG. 1) where controls may be applied.

The SSL break and inspect rules 610 may include a set of break and inspect rules 614 configured to inspect and decrypt hypertext transfer protocol secure (HTTPS) sessions to serve decrypted traffic to the rest of the proxy rule set, including DLP. The SSL break and inspect rules 610 may include an SSL bypass list exception 614 that allows traffic to sites in the bypass list to not be decrypted.

The global policy rules 620 may apply control and blocking of uniform resource locators (URLs) based on web proxy category. A safelist and user exceptions 622 ruleset may include, or may be included in the global policy rules 620 with, a blocked categories and URLs list 624, a list of allowed sanctioned domains 626, a list of blocked unsanctioned (i.e., blocked) domains 628, and caution prompt rules 630. The blocked categories and URLs list 624 and the blocked unsanctioned domains 628 may correspond to network services, URLs, categories, and domains associated with unsanctioned access controls, while the list of allowed sanctioned domains 626 may correspond to domains matching a list of sanctioned (i.e., accessible) domains, network services, URLs, categories, and the like. It is noted that existing proxy exceptions for different users and groups to different domains and categories may have been granted across an enterprise. The use of proxy configuration rules disclosed herein may not disrupt those prior exceptions by layering in additional blocking rules. For example, all rules enforcing controls applied in accordance with the concepts described herein may occur after category and URL blocking, which may happen after exceptions to help facilitate that the complex existing user exceptions are honored without the need for duplicate user exceptions. After all exceptions have been evaluated, domains matching the unsanctioned list may be blocked (i.e., based on the unsanctioned control tags) using existing proxy blocking techniques (e.g., return 403 status code and block page).

The browser isolation rules 640 may include exceptions 642, domain isolation rules 644, a proxy chain 646, and traffic header rules 648. Like the global policy rules exceptions, the exceptions 642 may provide exceptions to isolate bypass sites and user level exceptions. The domain isolation rules 644 and the traffic header rules 648 may operate to in a "proxy chaining" design (shown in FIG. 6 as proxy chain 646), sending traffic to a next proxy hop. For example, the proxy may determine if a domain matches one or more isolation domains identified in a list corresponding to the domain isolation rules 644. When a match is found, a header may be written to the web request, such as a header "x-casb isolate". The traffic header rules 648 may detect the header and apply an isolation profile configured to isolate the traffic.

The ICAP-send to DLP rules 650 may include exceptions 652, upload block rules 654, send to DLP rules 656, and read-only→write header rules 658. The send to DLP rules 650 may be configured to send POST and PUT events to DLP for content inspection via ICAP. The exceptions 652 may be configured to determine if a domain matches a "read-only" list (i.e., a list of network services or domains associated with read-only control tags). If the domain matches, a custom header for enforcing access controls in accordance with the concepts described herein may be written to the POST or PUT event and it is sent to DLP for inspection via the send to DLP rules 656. A custom DLP keyword rule may be designed to detect the existence of the custom header(s) and when present, the send to DLP rules 656 may automatically block the POST or PUT event. In an aspect, the POST or PUT events may be blocked selectively by associating one or more filetypes with the blocking of the event(s), such as to limit blocking of POST or PUT events involving certain filetypes. This may enable file uploads to be blocked while allowing forms to be populated. It is noted that blocking POST and/or PUT events may be configured on a per-domain basis such that all POST and/or PUT events may be blocked for some domains, while some POST and/or PUT events may be allowed for other domains. Blocking of POST and/or PUT events may correspond to a read-only control.

It is noted that proxy rules may be applied in the direction shown by arrow 660. Thus, blocking or restricting access to a network service may be achieved at various levels within the proxy configuration. As noted above, the proxy rules may enable controlling of access to network services on a micro- or macro-level (e.g., based on individual users, user groups, domains, etc. or service categories, service types, service features, and the like). If traffic is analyzed via the enforcement proxy 250 and no rules are detected in connection with blocking or restricting access, the traffic may be deemed sanctioned traffic and permitted. It is noted that the example rules and rulesets described above with reference to FIG. 6 are provided by way of illustration, rather than limitation and additional rules, different rules, or a combination thereof, may be designed and utilized to control access to network services in accordance with the concepts described herein.

Figure 3:
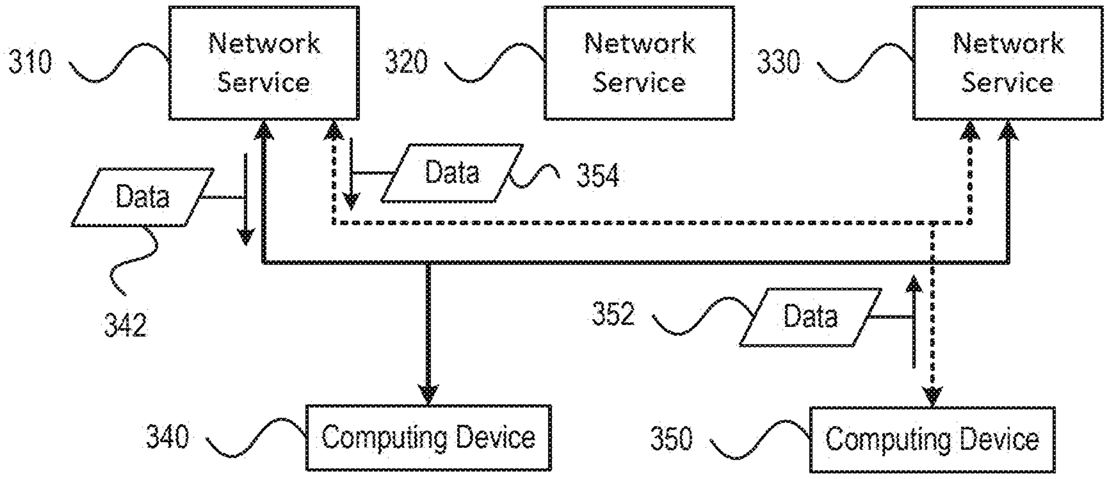
FIG. 3 is a block diagram illustrating example controls that may be provided for controlling access to network services in accordance with aspects of the present disclosure.

To further illustrate the above-identified concepts, and referring to FIG. 3, a block diagram illustrating providing control of network services in accordance with the concepts described herein is shown. In particular, FIG. 3 shows network services 310, 320, 330 and computing devices 340, 350. The network services 310, 320, 330 may correspond to different ones of the network services 130 of FIG. 1 and the computing devices 340, 350 may correspond to computing devices 140 of FIG. 1. Using the techniques described above with reference to FIGS. 1, 2, 4, and 6, various controls may be defined for controlling how users of the computing device 340, 350 access and interact with the network services 310-330, as shown in Table 3. In particular, Table 3 indicates the network service 310 is associated with a read-only control (e.g., a data access control 222) for the computing device 340 and a sanctioned control for the computing device 350. The network service 320 may be associated with an unsanctioned control for both computing devices 340, 350, and the network service 330 may be associated with a sanctioned control for both computing devices 340, 350.

TABLE 3

| | Network Service 310 | Network Service 320 | Network Service 330 |
|---|---|---|---|
| Comp. Device 340 | RO | Unsanctioned | Sanctioned |
| Comp. Device 350 | Sanctioned | Unsanctioned | Sanctioned |

In an aspect, the controls applied to the network service 310 may be different for the computing devices 340, 350 based on association of the respective controls to individual users (e.g., the user of computing device 340 is granted restricted access to the network service 310 and the user of computing device 350 is granted sanctioned or full access to the network service 310) and/or a user group basis (e.g., the computing device 340 may be part of a user group granted restricted access to the network service 310 and the computing device 350 may be part of a user group granted full access to the network service 310). Based on the controls associated with the network service 310, the computing device 340 may be able to receive and view data 342 from the network service 310, but may not transmit or upload data to the network service 310. Since the sanctioned control is associated with the network service 310 for the computing device 350, the computing device 350 may provide data 352 to the network service 310 and may receive data 354 from the network service 310. Since the network service 320 is associated with the unsanctioned control, neither the computing device 340 or the computing device 350 may access the network service 320. The network service 330 is associated with the sanctioned control for both computing devices 340, 350, indicating the computing devices 340, 350 are both granted full access to the network service 330.

As explained above with reference to FIGS. 2 and 6, as the computing devices 340, 350 attempt to access the network services 310-330, enforcement of the controls associated with the network services 310-330 may be enforced (e.g., by the enforcement proxy 250 of FIG. 2) based on proxy configuration information. For example, a request to access the network service 310 may be detected by the enforcement proxy. If the request is received from the computing device 340, the ICAP-Send to DLP rules may determine that a header be appended to the request to designate access as read-only per the control configured for the computing device 340 and the network service 310. With respect to access of the network service 310 by the computing device 350, the enforcement proxy may determine the access is sanctioned (e.g., full access) based on a Global Policy Rule or based on not detecting any other proxy rules that would limit access to the network service 310 with respect to the computing device 350. Because the access is sanctioned, the computing device 350 may transmit data 352 to and receive data 354 from the network service 310. When the computing devices 340, 350 attempt to access network service 320, the enforcement proxy may detect the unsanctioned control (e.g., based on a Global Policy Rule for blocked domains) and block the requested access to the network service 320. Similarly, a Global Policy Rule for allowed domains may be utilized by the enforcement proxy to grant or authorize access to the network service 330 for the computing devices 340, 350 or access may be authorized or granted based on the enforcement determining there are no proxy rules that would otherwise restrict or block access.

Figure 5:
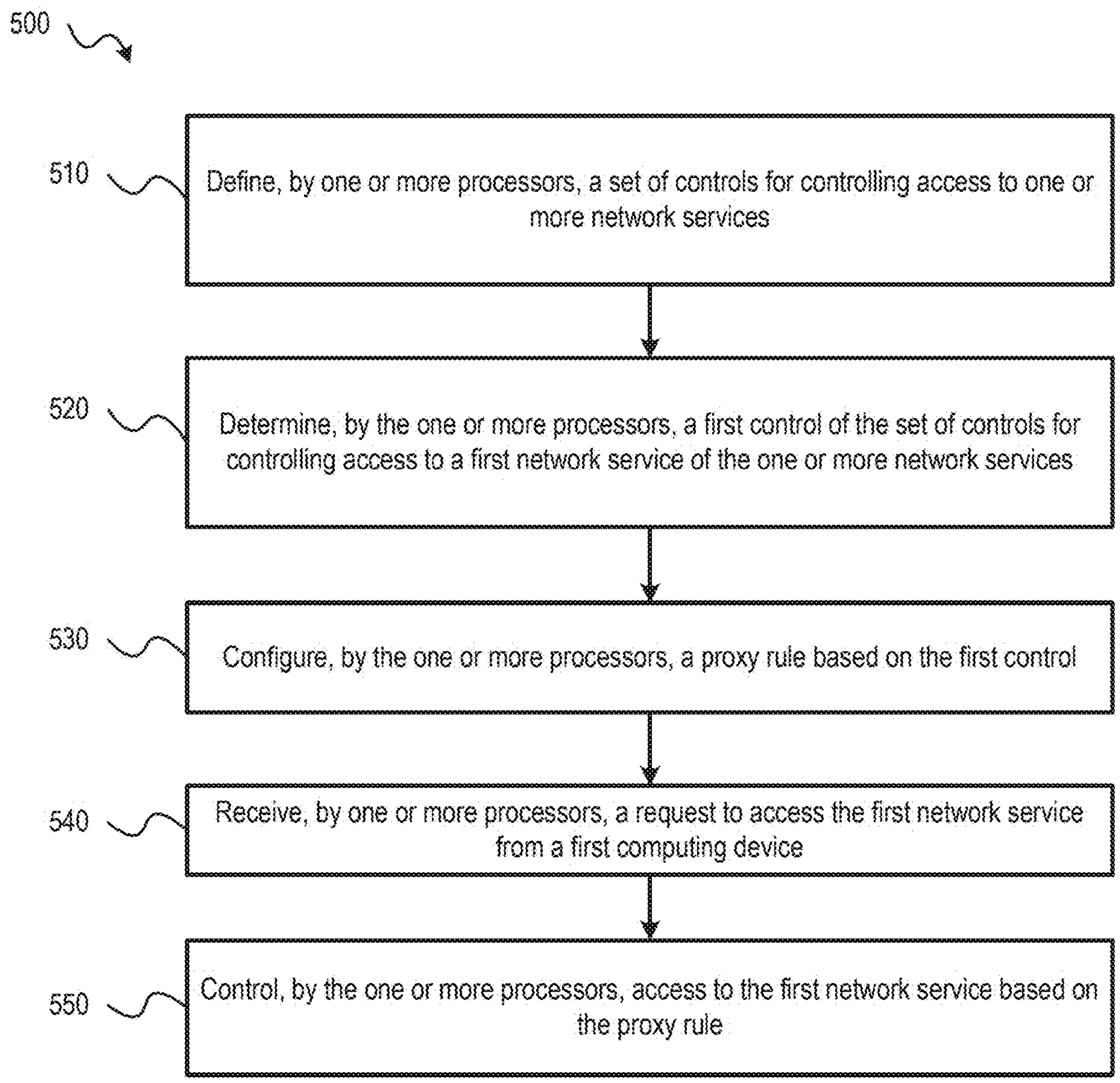
FIG. 5 is a flow diagram illustrating an example method for controlling access to network services in accordance with aspects of the present disclosure.
Figure 6:
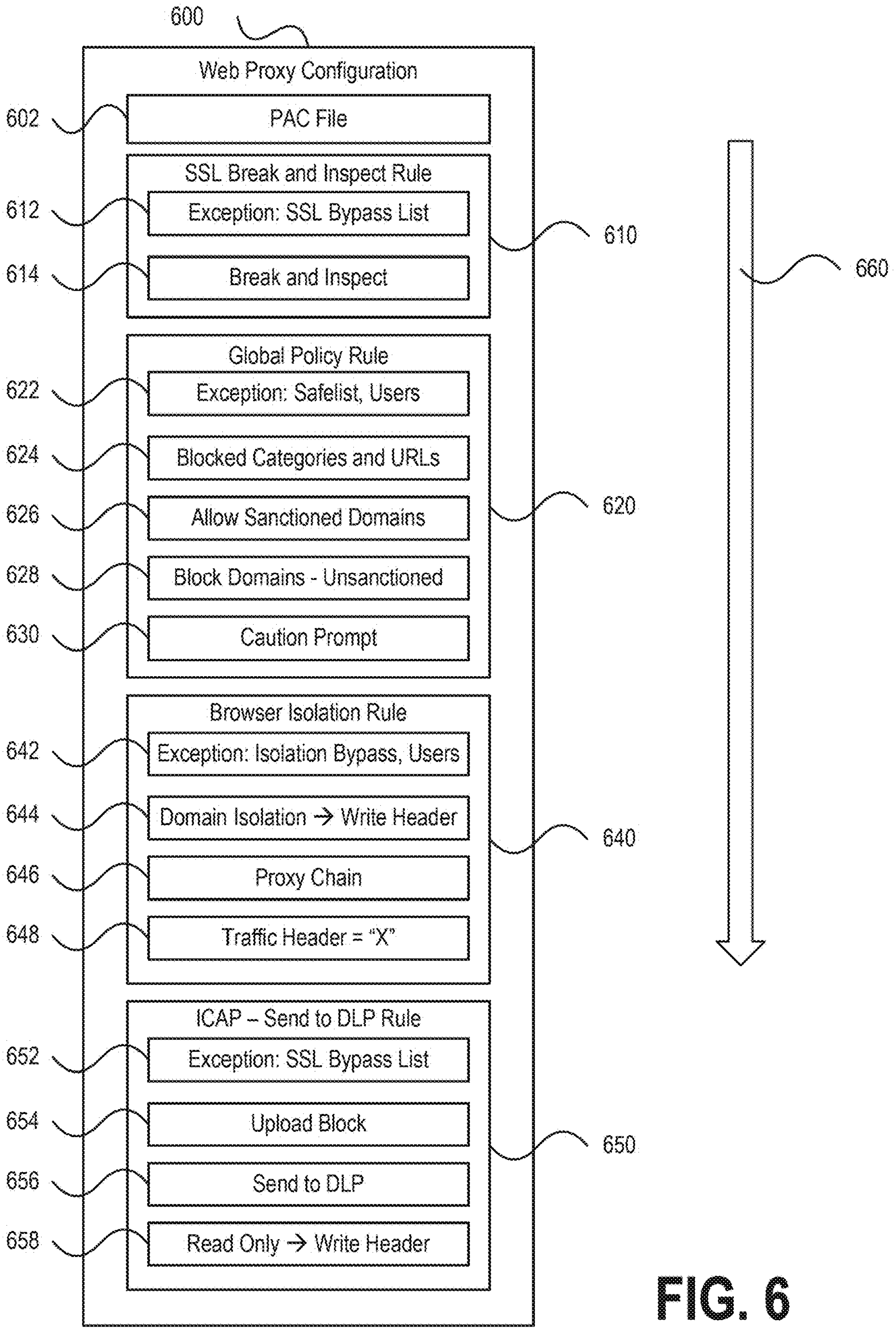
FIG. 6 is a block diagram illustrating an example control process for controlling access to network services in accordance with aspects of the present disclosure.

Referring to FIG. 5, a flow diagram of an example method for controlling access to network services in accordance with aspects of the present disclosure is shown as a method 500. It is noted that the steps or operations described with reference to FIG. 5 are meant to further illustrate aspects of the functionality provided by the one or more service controllers 120 of FIG. 1 and 200 of FIG. 2. The steps or operations of the method 500 may be stored as instructions (e.g., the instructions 116 of FIG. 1) that, when executed by one or more processors (e.g., the one or more processors 112 and/or the one or more service controllers 120 of FIG. 1 and 200 of FIG. 2), cause the one or more processors to perform the steps of the method 500. It should be understood that the method 500 may be configured to perform various ones of the operations described above with reference to FIGS. 1-4 and 6 to control access to network services in accordance with aspects of the present disclosure.

At block 510, the method 500 includes defining, by one or more processors, a set of controls for controlling access to one or more network services. In an aspect, the one or more network services include a first network service, and the first network service may be a SaaS service. As explained above controlling access to SaaS services has previously been problematic because such services do not require installation of software and an inventory of such services is not traditionally maintained by enterprises. The set of controls may include a sanctioned control, an unsanctioned control, a read-only control, an isolate control, other types of controls, or a combination thereof, as described above with reference to FIGS. 1-4 and 6. In an aspect, the set of controls may be constructed as an approval matrix that defines a plurality of network service attributes and associates a particular control to each different combination of network service attributes, as described above with reference to Table 1. The attributes may include governance attributes, IT or security architecture attributes, CMDB attributes, inventory attributes, or other attributes. In an aspect, the method 500 may include applying one or more analytics to at least one data source to extract attributes corresponding to network services, as described above with reference to analytics engine 230 of FIG. 2. In an aspect, the method 500 may include obtaining an initial software inventory, such as the initial software inventory data set 410 of FIG. 4. The initial software inventory may be used to generate an enhanced inventory data structure, such as the enhanced inventory data structure 400 of FIG. 4. For example, the enhanced inventory data structure may be generated by incorporating one or more extracted attributes into the enhanced data structure. In an aspect, the enhanced inventory data structure may include at least a portion of the initial software inventory, at least one of the extracted attributes, and at least one control for each of the network services.

At step 520, the method 500 includes determining, by the one or more processors, a first control of the set of controls for controlling access to a first network service of the one or more network services. In an aspect, the first control may be determined based on the set of controls. For example, as described above, a set of attributes may be determined and the control corresponding to the attributes may be identified based on the approval matrix. In an aspect, when a control is determined for a network service based on the approval matrix and attributes of the network service, the control may be recorded to the enhanced inventory data structure. In this manner, the enhanced inventory data structure provides a holistic and comprehensive view of available network services, including network service attributes and controls, as well as notes and other features of the network services (e.g., network service status, such as pending approval, approved status, retired status, etc.) that may be periodically reviewed and updated over time.

At step 530, the method 500 includes configuring, by the one or more processors, a proxy rule based on the first control. As explained above with reference to FIG. 6, the proxy rules may be configured to detect access to network services for which controls are provided. In an aspect, the proxy rules may include a pointer to where control tags are located and criteria for when the pointer should be used to retrieve a relevant control tag. For example, the pointer may point to the enhanced inventory data structure where control tags may be stored in association with each network service. When access to a network service is requested, the proxy may detect a control is needed based on the proxy rule and then retrieve the appropriate control from the enhanced inventory data structure based on the pointer. In an additional or alternative aspect, the proxy rules may include the controls and network service information to enable controls to be applied to requests to access network services without requiring retrieval of the control tag from the enhanced inventory data structure or other location where control information may be stored. It is noted that any number of proxy rules may be configured to enable control of access to network services in accordance with the concepts described herein. For example, a second proxy rule may be configured or defined for the first network service, where the second proxy rule is configured to provide a second computing device with different access permissions relative to the first computing device, as described above with reference to FIG. 3 and the access provided to the network service 310 with respect to the computing devices 340, 350.

At step 540, the method 500 includes receiving, by one or more processors, a request to access the first network service from a first computing device. As explained above, an enforcement proxy (e.g., the service controller 120 of FIG. 1 or the enforcement proxy 250 of FIG. 2) may be configured to analyze the request and apply one or more proxy rules to the request to process the request. Processing the request may include determining an access control for controlling access by the first computing device to the first network service. At step 550, the method 500 includes controlling, by the one or more processors, access to the first network service based on the proxy rule. As described above with reference to FIG. 3, controlling access to the first network service may include allowing access to the first network service (e.g., a sanctioned control), blocking access to the first network service (e.g., an unsanctioned control), restricting access to the first network service (e.g., a read-only control), or isolating the first network service (e.g., an isolate control), as described above with reference to FIGS. 3, 4, and 6. In an aspect, controlling access to the first network service may include adding a header to the request, where the header is configured to control, at least in part, access to the first network service. For example, the header may designate the access as read-only access or isolated access, as described above with reference to FIG. 6 (e.g., the header may include an instruction to isolate access to the first network service or an instruction to restrict access to the first network service to read-only). It is noted that the enhanced inventory data structure may be periodically updated based on feedback. The feedback may include a modification of one or more controls, a modification of one or more of the at least one extracted attributes (e.g., a change in governance data, a change in security or IT architecture, etc.), adding a new network service (e.g., upon discovery of a new network service), changing a status of an attribute for a particular network service (e.g., from active to sunset), other updates or changes, or a combination thereof.

As shown above, the systems and methods disclosed herein provide a framework for defining how control of network services, such as SaaS services, are controlled in a manner that may be applied consistently and automatically across an enterprise. To illustrate, the disclosed systems and methods also support generation of an approval matrix that provides a comprehensive list of controls and attributes that may be used to determine controls for network services (e.g., via defining controls for various combinations of network service attributes) and generation of an enhanced inventory data structure. The approval matrix may be used to determine controls for a new network service based on attributes of the service (e.g., by identifying a combination of attributes in the approval matrix matching attributes of the network service and then applying one or more controls corresponding to the attribute combination). Similarly, the enhanced inventory data structure provides a comprehensive view of an enterprise software inventory, including SaaS and other network services, as well as information that may be used to control how access to the network services is provided. The approval matrix and enhanced inventory data structure enable an enterprise to define, manage, and monitor use of network services in a manner that was not previously possible using conventional network monitoring tools and provides the ability to scale control over network services at an enterprise where thousands of network services or tens of thousands of network services may be in use. Further, the techniques disclosed herein support granular control of access to network services, such as to enable control on a per-user basis (e.g., where different users are provided different access to a network service), a user group-basis (e.g., access is controlled based on a user role or department within the enterprise), or other granular controls.

It is noted that utilization of the techniques disclosed herein may be deployed in stages, where controls are rolled out in a manner that balances risk tolerance with the fact that network controls have not previously been imposed on certain network services, such as SaaS services, and that implementing such controls could potentially disrupt processes and workflows that rely on SaaS products or other types of network services. For example, in early deployment phases, more network services may be sanctioned to avoid disruption of processes and workflows and few network services may have the unsanctioned control applied to them. However, as development of the approval matrix and enhanced inventory data structure matures, the capability to provide more granular control over network service access may become more prevalent. For example, the universe of network services may include 30,000 services (e.g., SaaS products). After performing initial discovery an enterprise may determine that 10,000 services are in use within the enterprise and may determine to block access to 3,000 services, allow access to 6,000 services, and for the remaining 1,000 services, access may be allowed until review is complete. However, this leaves 20,000 unreviewed and unknown services the enterprise does not know about. As the review and evaluation of the network services progresses, the enterprise may determine to block access to 4,000 services, which may include all or only some of the initial blocked services and allow access to the remaining 6,000 services in use within the organization. The remaining 20,000 undiscovered or unused services may be blocked, and processes may be put in place to enable requests for access to these 20,000 services to be reviewed and appropriate controls put in place on a per-service-basis. It is noted that although access to the 6,000 services is described above, such control may include restricted or limited access controls (e.g., read-only) and isolated controls, as well as sanctioned controls. Thus, as the utilization of the concepts described herein matures within an organization, customized access controls may be deployed to provide more robust control over access to network services.

Clause 1: A method comprising: defining, by one or more processors, a set of controls for controlling access to one or more network services; determining, by the one or more processors, a first control of the set of controls for controlling access to a first network service of the one or more network services; configuring, by the one or more processors, a proxy rule based on the first control; receiving, by one or more processors, a request to access the first network service from a first computing device; and controlling, by the one or more processors, access to the first network service based on the proxy rule.

Clause 2: The method of clause 1, wherein the first network service comprises a software as a service (SaaS) service.

Clause 3: The method of clause 1 or 2, wherein controlling access to the first network service comprises: allowing access to the first network service; blocking access to the first network service; restricting access to the first network service; or isolating the first network service.

Clause 4: The method of any of clauses 1 to 3, wherein controlling access to the first network service comprises adding a header to the request, wherein the header is configured to control, at least in part, access to the first network service.

Clause 5: The method of clause 4, wherein the header comprises an instruction to isolate access to the first network service or an instruction to restrict access to the first network service to read-only.

Clause 6: The method of any of clauses 1 to 5, wherein a second proxy rule is configured for the first network service, and wherein the second proxy rule is configured to provide a second computing device with different access permissions relative to the first computing device.

Clause 7: The method of any of clauses 1-6, wherein the set of controls comprises an approval matrix defining a plurality of network service attributes and associating a particular control to each different combination of network service attributes.

Clause 8: The method of clause 7, wherein plurality of network service attributes comprise governance policy attributes, network service inventory attributes, security architecture attributes, service category attributes, configuration management database (CMDB) attributes, or a combination thereof.

Clause 9: The method of any of clauses 1-8, further comprising: obtaining an initial software inventory; and enhancing the initial software inventory to produce an enhanced inventory data structure.

Clause 10: The method of clause 9, wherein enhancing the initial software inventory comprises: applying one or more analytics to at least one data source to extract attributes corresponding to network services; and incorporating the extracted attributes into the enhanced data structure, wherein the enhanced inventory data structure comprises at least a portion of the initial software inventory, at least one of the extracted attributes, and at least one control for each of the network services.

Clause 11: The method of clause 9 or 10, further comprising periodically updating the enhanced inventory data structure based on feedback, wherein the feedback comprises: a modification of one or more controls; a modification of one or more of the at least one extracted attributes; adding a new network service; changing a status of an attribute for a particular network service; or a combination thereof.

Clause 12: A system comprising: a memory; and one or more processors communicatively coupled to the memory, the one or more processors configured to: define a set of controls for controlling access to one or more network services; determine a first control of the set of controls for controlling access to a first network service of the one or more network services; configure a proxy rule based on the first control; receive a request to access the first network service from a first computing device; and control access to the first network service based on the proxy rule.

Clause 13: The system of clause 12, wherein the first network service comprises a software as a service (SaaS) service.

Clause 14: The system of clause 12 or 13, wherein controlling access to the first network service comprises: allowing access to the first network service; blocking access to the first network service; restricting access to the first network service; or isolating the first network service.

Clause 15: The system of any of clauses 12 to 14, wherein controlling access to the first network service comprises adding a header to the request, and wherein the header is configured to control, at least in part, access to the first network service.

Clause 16: The system of clause 15, wherein the header comprises an instruction to isolate access to the first network service or an instruction to restrict access to the first network service to read-only.

Clause 17: The system of any of clauses 12 to 16, wherein a second proxy rule is configured for the first network service, and wherein the second proxy rule is configured to provide a second computing device with different access permissions relative to the first computing device.

Clause 18: The system of any of clauses 12 to 17, wherein the set of controls comprises an approval matrix defining a plurality of network service attributes and associating a particular control to each different combination of network service attributes.

Clause 19: The system of clause 18, wherein plurality of network service attributes comprise governance policy attributes, network service inventory attributes, security architecture attributes, service category attributes, configuration management database (CMDB) attributes, or a combination thereof.

Clause 20: The system of any of clauses 12 to 19, wherein the one or more processors are configured to: obtain an initial software inventory; and enhance the initial software inventory to produce an enhanced inventory data structure; and store the enhanced inventory data structure is stored in the memory.

Clause 21: The system of clause 20, wherein enhancing the initial software inventory comprises: applying one or more analytics to at least one data source to extract attributes corresponding to network services; and incorporating the extracted attributes into the enhanced data structure, wherein the enhanced inventory data structure comprises at least a portion of the initial software inventory, at least one of the extracted attributes, and at least one control for each of the network services. It is noted that storing the enhanced inventory data structure having the at least one control in the memory may enable controls to be applied to requests more quickly, thereby reducing delay and the appearance of network slowdowns when applying controls to requests to access network resources and enabling such requests to be processed more efficiently.

Clause 22: The system of any of clauses 20 or 21, wherein the one or more processors are configured to periodically update the enhanced inventory data structure based on feedback, wherein the feedback comprises: a modification of one or more controls; a modification of one or more of the at least one extracted attributes; adding a new network service; changing a status of an attribute for a particular network service; or a combination thereof.

Clause 23. A non-transitory computer-readable storage medium storing instructions that, when executed by one or more processors, cause the one or more processors to perform operations comprising: defining, by one or more processors, a set of controls for controlling access to one or more network services; determining, by the one or more processors, a first control of the set of controls for controlling access to a first network service of the one or more network services; configuring, by the one or more processors, a proxy rule based on the first control; receiving, by one or more processors, a request to access the first network service from a first computing device; and controlling, by the one or more processors, access to the first network service based on the proxy rule.

Clause 24: The non-transitory computer-readable storage medium of clause 23, wherein the first network service comprises a software as a service (SaaS) service.

Clause 25: The non-transitory computer-readable storage medium of clause 23 or 24, wherein controlling access to the first network service comprises: allowing access to the first network service; blocking access to the first network service; restricting access to the first network service; or isolating the first network service.

Clause 26: The non-transitory computer-readable storage medium of any of clauses 23 to 25, wherein controlling access to the first network service comprises adding a header to the request, wherein the header is configured to control, at least in part, access to the first network service.

Clause 27: The non-transitory computer-readable storage medium of clause 26, wherein the header comprises an instruction to isolate access to the first network service or an instruction to restrict access to the first network service to read-only.

Clause 28: The non-transitory computer-readable storage medium of any of clauses 23 to 27, wherein a second proxy rule is configured for the first network service, and wherein the second proxy rule is configured to provide a second computing device with different access permissions relative to the first computing device.

Clause 29: The non-transitory computer-readable storage medium of any of clauses 23 to 28, wherein the set of controls comprises an approval matrix defining a plurality of network service attributes and associating a particular control to each different combination of network service attributes.

Clause 30: The non-transitory computer-readable storage medium of clause 29, wherein plurality of network service attributes comprise governance policy attributes, network service inventory attributes, security architecture attributes, service category attributes, configuration management database (CMDB) attributes, or a combination thereof.

Clause 31: The non-transitory computer-readable storage medium of any of clauses 23 to 30, further comprising: obtaining an initial software inventory; and enhancing the initial software inventory to produce an enhanced inventory data structure.

Clause 32: The non-transitory computer-readable storage medium of clause 31, wherein enhancing the initial software inventory comprises: applying one or more analytics to at least one data source to extract attributes corresponding to network services; and incorporating the extracted attributes into the enhanced data structure, wherein the enhanced inventory data structure comprises at least a portion of the initial software inventory, at least one of the extracted attributes, and at least one control for each of the network services.

Clause 33: The non-transitory computer-readable storage medium of clause 31 or 32, further comprising periodically updating the enhanced inventory data structure based on feedback, wherein the feedback comprises: a modification of one or more controls; a modification of one or more of the at least one extracted attributes; adding a new network service; changing a status of an attribute for a particular network service; or a combination thereof.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:

obtaining an initial software inventory;

applying one or more analytics to at least one data source to extract attributes corresponding to one or more network services associated with the software inventory;

incorporating the extracted attributes into an enhanced inventory data structure, wherein the enhanced inventory data structure comprises at least a portion of the initial software inventory, at least one of the extracted attributes, and at least one control for each of the one or more network services;

determining, by the one or more processors, a first control of the enhanced inventory data structure for controlling access to a first network service of the one or more network services;

configuring, by the one or more processors, a proxy rule based on the first control;

receiving, by one or more processors, a request to access the first network service from a first computing device; and controlling, by the one or more processors, access to the first network service based on the proxy rule, wherein controlling access to the first network service comprises adding a header to the request, wherein the header is configured to control, at least in part, access to the first network service, and wherein the header comprises an instruction to isolate access to the first network service or an instruction to restrict access to the first network service to read-only.

2. The method of claim 1, wherein the first network service comprises a software as a service (SaaS) service.

3. The method of claim 2, wherein controlling access to the first network service comprises:

restricting access to the first network service; or isolating the first network service.

4. The method of claim 2, wherein a second proxy rule is configured for the first network service, and wherein the second proxy rule is configured to provide a second computing device with different access permissions relative to the first computing device.

5. The method of claim 1, wherein the enhanced inventory data structure comprises an approval matrix defining a plurality of network service attributes and associating a particular control to each different combination of network service attributes.

6. The method of claim 5, wherein the plurality of network service attributes comprise governance policy attributes, network service inventory attributes, security architecture attributes, service category attributes, configuration management database (CMDB) attributes, or a combination thereof.

7. The method of claim 1, further comprising periodically updating the enhanced inventory data structure based on feedback, wherein the feedback comprises:

a modification of one or more controls;

a modification of one or more extracted attributes;

adding a new network service;

changing a status of an attribute for a particular network service; or a combination thereof.

8. The method of claim 1, wherein the header comprises the instruction to isolate access to the first network service, and wherein the instruction to isolate access to the first network service comprises an instruction to isolate traffic associated with the first network service.

9. A system comprising:

a memory; and one or more processors communicatively coupled to the memory, the one or more processors configured to:

obtain an initial software inventory;

apply one or more analytics to at least one data source to extract attributes corresponding to one or more network services associated with the software inventory;

incorporate the extracted attributes into an enhanced inventory data structure, wherein the enhanced inventory data structure comprises at least a portion of the initial software inventory, at least one of the extracted attributes, and at least one control for each of the one or more network services determine a first control of the enhanced inventory data structure for controlling access to a first network service of the one or more network services;

configure a proxy rule based on the first control;

receive a request to access the first network service from a first computing device; and control access to the first network service based on the proxy rule, wherein controlling access to the first network service comprises adding a header to the request, wherein the header is configured to control, at least in part, access to the first network service, and wherein the header comprises an instruction to isolate access to the first network service or an instruction to restrict access to the first network service to read-only.

10. The system of claim 9, wherein the first network service comprises a software as a service (SaaS) service, and wherein controlling access to the first network service comprises:

restricting access to the first network service; or isolating the first network service.

11. The system of claim 9, wherein a second proxy rule is configured for the first network service, and wherein the second proxy rule is configured to provide a second computing device with different access permissions relative to the first computing device.

12. The system of claim 9, wherein the enhanced inventory data structure comprises an approval matrix defining a plurality of network service attributes and associating a particular control to each different combination of network service attributes, wherein the plurality of network service attributes comprise governance policy attributes, network service inventory attributes, security architecture attributes, service category attributes, configuration management database (CMDB) attributes, or a combination thereof.

13. The system of claim 9, wherein the header comprises the instruction to isolate access to the first network service, and wherein the instruction to isolate access to the first network service comprises an instruction to isolate traffic associated with the first network service.

14. The system of claim 9, wherein the one or more processors are further configured to periodically update the enhanced inventory data structure based on feedback, wherein the feedback comprises:

a modification of one or more controls;

a modification of one or more extracted attributes;

adding a new network service;

changing a status of an attribute for a particular network service; or a combination thereof.

15. The system of claim 9, wherein the enhanced inventory data structure comprises an approval matrix defining a plurality of network service attributes and associating a particular control to each different combination of network service attributes.

16. A non-transitory computer-readable storage medium storing instructions that, when executed by one or more processors, cause the one or more processors to perform operations comprising:

obtaining, by the one or more processors, an initial software inventory;

applying, by the one or more processors one or more analytics to at least one data source to extract attributes corresponding to one or more network services associated with the software inventory;

incorporating, by the one or more processors the extracted attributes into an enhanced inventory data structure, wherein the enhanced inventory data structure comprises at least a portion of the initial software inventory, at least one of the extracted attributes, and at least one control for each of the one or more network services;

determining, by the one or more processors, a first control of the enhanced inventory data structure for controlling access to a first network service of the one or more network services;

configuring, by the one or more processors, a proxy rule based on the first control;

receiving, by one or more processors, a request to access the first network service from a first computing device; and controlling, by the one or more processors, access to the first network service based on the proxy rule, wherein controlling access to the first network service comprises adding a header to the request, wherein the header is configured to control, at least in part, access to the first network service, and wherein the header comprises an instruction to isolate access to the first network service or an instruction to restrict access to the first network service to read-only.

17. The non-transitory computer-readable storage medium of claim 16, wherein the first network service comprises a software as a service (SaaS) service.

18. The non-transitory computer-readable storage medium of claim 16, wherein controlling access to the first network service comprises:

restricting access to the first network service; or isolating the first network service.

19. The non-transitory computer-readable storage medium of claim 16, wherein the header comprises the instruction to isolate access to the first network service, and wherein the instruction to isolate access to the first network service comprises an instruction to isolate traffic associated with the first network service.

20. The non-transitory computer-readable storage medium of claim 16, further storing instructions that, when executed by one or more processors, cause the one or more processors to perform operations comprising periodically updating the enhanced inventory data structure based on feedback, wherein the feedback comprises:

a modification of one or more controls;

a modification of one or more extracted attributes;

adding a new network service;

changing a status of an attribute for a particular network service; or a combination thereof.

* * * * *